(12) United States Patent
Tashiro et al.

(10) Patent No.: US 9,725,089 B2
(45) Date of Patent: Aug. 8, 2017

(54) VEHICLE CONTROL DEVICE AND VEHICLE CONTROL METHOD

(71) Applicant: NISSAN MOTOR CO., LTD., Yokohama-shi, Kanagawa (JP)

(72) Inventors: Takanori Tashiro, Atsugi (JP); Makoto Uemura, Ebina (JP); Kouichi Shimizu, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 30 days.

(21) Appl. No.: 14/787,731

(22) PCT Filed: Apr. 8, 2014

(86) PCT No.: PCT/JP2014/060145
§ 371 (c)(1),
(2) Date: Oct. 28, 2015

(87) PCT Pub. No.: WO2014/178264
PCT Pub. Date: Nov. 6, 2014

(65) Prior Publication Data
US 2016/0082961 A1    Mar. 24, 2016

(30) Foreign Application Priority Data

Apr. 30, 2013  (JP) ................ 2013-095083

(51) Int. Cl.
*B60W 30/14* (2006.01)
*B60K 31/00* (2006.01)
(Continued)

(52) U.S. Cl.
CPC .......... *B60W 30/143* (2013.01); *B60K 31/00* (2013.01); *B60T 7/22* (2013.01); *B60T 8/00* (2013.01);
(Continued)

(58) Field of Classification Search
CPC .... B60W 30/143; B60W 30/02; B60W 30/16; B60W 30/09; B60T 7/22; B60T 8/00;
(Continued)

(56) References Cited

U.S. PATENT DOCUMENTS 6,873,891 B2    3/2005  Moser et al.
7,212,888 B2 *  5/2007  Jessen ................ F02D 41/1497
                                                        477/97
(Continued)

FOREIGN PATENT DOCUMENTS

JP    10-203332 A    8/1998
JP    10-211873 A    8/1998
(Continued)

*Primary Examiner* — Anne M Antonucci
(74) *Attorney, Agent, or Firm* — Young Basile Hanlon & MacFarlane, P.C.

(57) ABSTRACT

A vehicle control device includes an input unit configured to receive plural requests for a physical amount to be controlled in a vehicle; a judgment unit configured to judge whether or not a degree of priority of each of the received requests is high: a second mediation unit configured to, when there are plural requests whose degrees of priority are judged not to be high, mediate these plural requests to determine a control target value (Rm); a transfer unit configured to, when there is a request whose degree of priority is judged to be high, transfer this request as the control target value; and an output unit configured to output the control target value transferred from the transfer unit or determined by the second mediation unit to a VDC.

7 Claims, 5 Drawing Sheets

(51) Int. Cl.
*B60T 8/00* (2006.01)
*B60T 8/17* (2006.01)
*B60T 8/1755* (2006.01)
*B60W 30/02* (2012.01)
*B60W 30/09* (2012.01)
*B60W 30/16* (2012.01)
*B60T 7/22* (2006.01)
*F02D 41/26* (2006.01)

(52) U.S. Cl.
CPC .............. *B60T 8/17* (2013.01); *B60T 8/1755* (2013.01); *B60W 30/02* (2013.01); *B60W 30/09* (2013.01); *B60W 30/16* (2013.01); B60K 2031/0025 (2013.01); B60T 2201/02 (2013.01); B60T 2260/08 (2013.01); *F02D 41/263* (2013.01)

(58) Field of Classification Search
CPC .............. B60T 8/1755; B60T 2260/08; B60T 2201/02; B60K 31/00; B60K 2031/0025; F02D 41/263
See application file for complete search history.

(56) References Cited

U.S. PATENT DOCUMENTS

| | | | |
|---|---|---|---|
| 2006/0041360 A1* | 2/2006 | Post, II | B60G 17/018 701/48 |
| 2010/0138077 A1* | 6/2010 | Kawai | F02D 41/1401 701/1 |
| 2010/0211246 A1 | 8/2010 | Kawai | |

FOREIGN PATENT DOCUMENTS

| | | |
|---|---|---|
| JP | 10-217928 A | 8/1998 |
| JP | 10-273029 A | 10/1998 |
| JP | 2000-142360 A | 5/2000 |
| JP | 2008-169825 A | 7/2008 |

* cited by examiner

VEHICLE CONTROL DEVICE AND VEHICLE CONTROL METHOD

CROSS REFERENCE TO RELATED APPLICATION

The present application is based on Japanese Patent Application No. 2013-095083 filed on Apr. 30, 2013, the entire content of which is herein incorporated by reference.

TECHNICAL FIELD

The present invention relates to a vehicle control device and a vehicle control method.

BACKGROUND

There has been conventionally known a vehicle control method in which a control target value is determined by mediating three or more requests whose order of priority is determined, for a control amount to be controlled in a vehicle (see Japanese Patent Application Publication No. 2008-169825).

The vehicle control method described in Patent Literature 1 performs mediation processing of determining one control target value by mediating plural input values (requests). Hence, transmission of the control target value to an object to be controlled is sometimes delayed due to a time lag caused by the mediation processing.

SUMMARY

The present invention has been made in view of the problem described above, and an object of the present invention is to provide a vehicle control device and a vehicle control method which have a function of mediating plural requests and which can transfer a request whose degree of priority is high at high speed.

When a vehicle control device according to one aspect of the present invention receives plural requests for a physical amount to be controlled in a vehicle, the vehicle control device judges whether or not a degree of priority of each of the received requests is high. When there are plural requests whose degrees of priority are judged not to be high, the vehicle control device mediates these plural requests to determine a control target value. When there is a request whose degree of priority is judged to be high, the vehicle control device transfers this request as the control target value. The vehicle control device outputs the transferred or mediated control target value to an object to be controlled.

DETAILED DESCRIPTION OF THE EMBODIMENTS

First Embodiment

Figure 1:
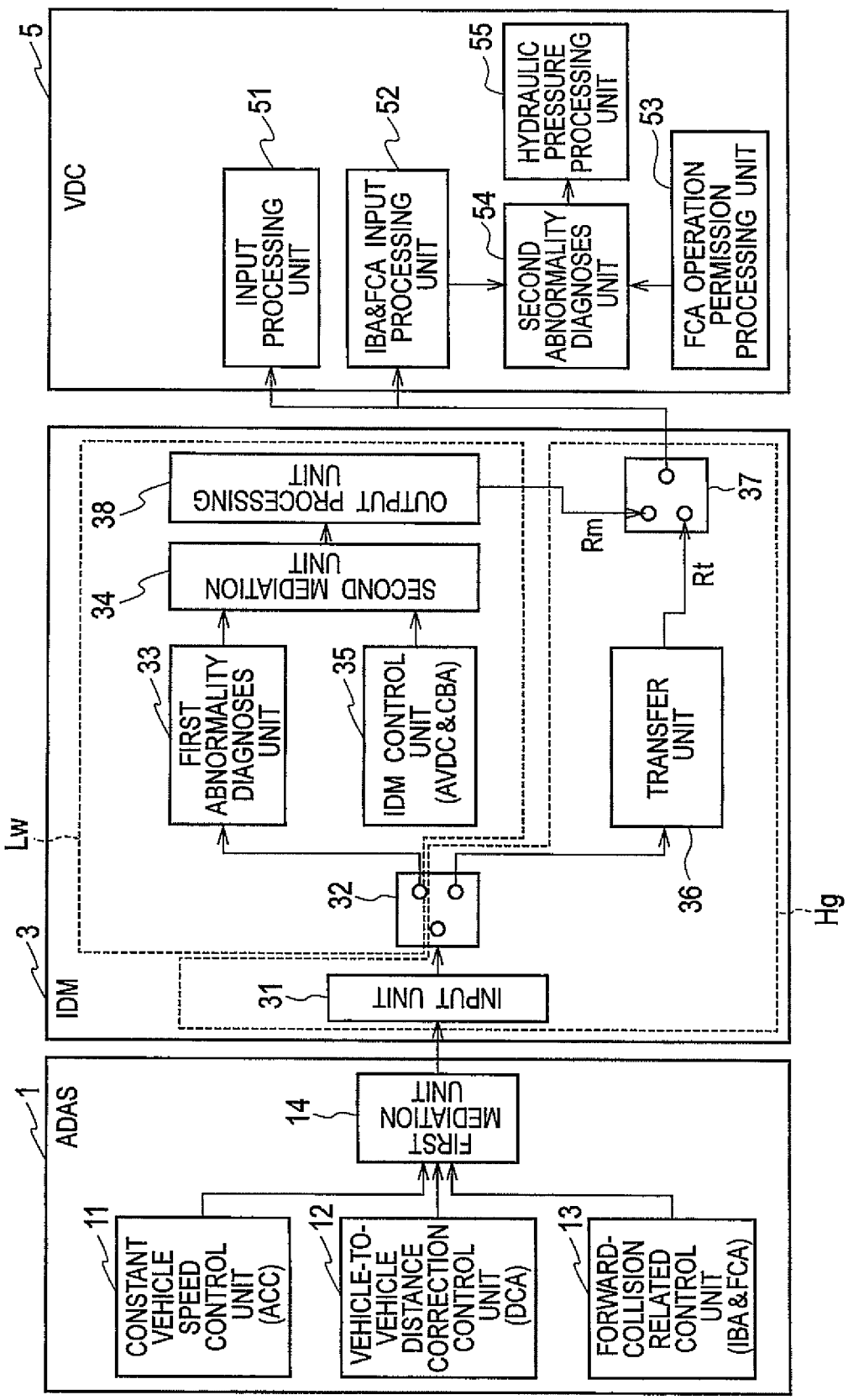
FIG. 1 is a block diagram showing a configuration of a vehicle control system including a vehicle control device in a first embodiment of the present invention.

An embodiment of the present invention is described below with reference to the drawings. In the illustration of the drawings, the same portions are denoted by the same reference numerals and description thereof is omitted.

A configuration of a vehicle control system including a vehicle control device in a first embodiment of the present invention is described with reference to FIG. 1. The vehicle control system includes: an advanced drive assisting system 1 configured to generate plural requests for a physical amount (for example, braking amount) to be controlled in a vehicle, based on information obtained mainly from the outside of the vehicle (for example, information on other vehicles existing around the vehicle); a vehicle control device 3 configured to mediate plural requests generated by the advanced drive assisting system 1 and requests generated based on information obtained mainly from the inside of the vehicle (for example, vehicle speed, steering angle, pedal operation amount, and scheduled traveling route) and output a control target value; and a VDC 5 (Vehicle Dynamics Controller) configured to control the physical amount to be controlled in the vehicle, based on the control target value outputted from the vehicle control device 3. Note that, in the embodiment of the present invention, the braking amount of the vehicle is given as an example of the physical amount to be controlled in the vehicle.

The advanced drive assisting system 1 is, for example a system called advanced driver assistance system (ADAS) and includes a constant vehicle speed control unit 11, a vehicle-to-vehicle distance correction control unit 12, and a forward-collision related control unit 13 as control logics configured to generate requests for the braking amount of the vehicle, based on the information obtained mainly from the outside of the vehicle.

The constant vehicle speed control unit 11 generates a request based on constant vehicle speed control (adaptive cruise control: ACC) of performing constant speed traveling control in which the vehicle speed is maintained at a target value and inter-vehicle distance control in which an inter-vehicle distance is controlled by detecting the distance to a vehicle in front, the speed relative to the vehicle in front, and the like. The vehicle-to-vehicle distance correction control unit 12 generates a request based on vehicle-to-vehicle distance correction control (distance control assist: DCA) of detecting the distance to a vehicle in front, the speed relative to the vehicle in front, and the like to prompt a driver to release an accelerator pedal, press a brake pedal, and perform similar operations and of performing the inter-vehicle distance control as necessary. The forward-collision related control unit 13 generates a request based on collision avoidance emergency brake control (forward collision avoidance: FCA) of performing brake control to avoid collision by receiving detection values such as the distance to an obstacle in front and the speed relative to the obstacle as inputs and also generates a request based on forward collision suppressing brake control (intelligent brake assist: IBA) of reducing collision damage as much as possible when collision cannot be avoided.

Since these control logics generate requests for the same physical amount (braking amount) for different objectives (from different perspectives), the requests generated by these control logics are sometimes different from one another. In view of this, the advanced drive assisting system 1 includes a first mediation unit 14 configured to mediate the request generated by the constant vehicle speed control unit 11, the request generated by the vehicle-to-vehicle distance correction control unit 12, and the request generated by the forward collision related control unit 13. The first mediation unit 14 outputs one request to the vehicle control device 3 as a result of the mediation.

The vehicle control device 3 is, for example, a device called intelligent drivability module (IDM). The vehicle control device 3 has a function of mediating plural requests for the same physical amount (braking amount) and achieves a function of transferring a request based on a certain objective (perspective) whose degree of urgency is high, to the VDC 5 without performing mediation.

In order to achieve the aforementioned functions, the vehicle control device 3 includes: an input unit 31 configured to receive plural requests for the physical amount (braking amount) to be controlled in the vehicle; a judgment unit 32 configured to judge whether or not a degree of priority of each of the received requests is high; a second mediation unit 34 (mediation unit) configured to, when there are plural requests whose degrees of priority are judged by the judgment unit 32 not to be high, mediate these plural requests to determine a control target value; a transfer unit 36 configured to, when there is a request whose degree of priority is judged by the judgment unit 32 to be high, transfer this request as the control target value; and an output unit 37 configured to output the control target value transferred from the transfer unit 36 or determined by the second mediation unit 34, to the VDC 5 which is an object to be controlled.

The input unit 31 receives a request outputted from the advanced drive assisting system 1 and transmits the request to the judgment unit 32. The judgment unit 32 judges whether or not the degree of priority of the request received from the input unit 31 is high to determine which one of the mediation processing and the transfer processing the received request is to be subjected to. When the degree of priority of the received request is high, the judgment unit 32 determines that the request is to be subjected to the transfer processing. Meanwhile, when the degree of priority of the received request is not high, the judgment unit 32 determines that the request is to be subjected to the mediation processing. Then, the judgment unit 32 transmits the request determined to be subjected to the mediation processing (hereafter, referred to as "general request") to a first abnormality diagnoses unit 33 and transmits the request determined to be subjected to the transfer processing (hereafter, referred to as "emergency request") to the transfer unit 36.

In the embodiment illustrated in FIG. 1, requests are classified in advance into a type of request whose degree of priority is high and a type of request whose degree of priority is not high. The request based on the constant vehicle speed control (ACC) and the request based on the vehicle-to-vehicle distance correction control (DCA) are judged to be the general requests whose degrees of priority are not high, while the request based on the collision avoidance emergency brake control (FCA) and the request based on the forward collision suppressing brake control (IBA) are judged to be the emergency requests whose degrees of priority are high. Note that the general requests whose degrees of priority are not high include a request based on side-slip prevention control (AVDC) and a request based on cornering speed control (CBA) in addition to the request based on the constant vehicle speed control (ACC) and the request based on the vehicle-to-vehicle distance correction control (DCA). Note that, as a method of judging whether or not the degree of priority of the received request is high, it is possible to use a method in which a parameter indicating the degree of priority is assigned to each type of request and a value of the parameter is compared with a threshold to determine whether the value is greater or smaller than the threshold.

The first abnormality diagnoses unit 33 diagnoses whether or not there is abnormality in the general requests and transmits the general requests with no abnormality to the second mediation unit 34. Moreover, the vehicle control device 3 includes an IDM control unit 35 configured to generate a request for the braking amount, based on an objective (perspective) different from those of the control logics (11 to 13) included in the advanced drive assisting system 1. The IDM control unit 35 generates the request (general request) based on the cornering speed control (cornering brake assist: CBA). The cornering speed control (CBA) is braking control of maintaining the vehicle speed during the cornering of the vehicle within an appropriate range. The general request generated by the IDM control unit 35 is transmitted to the second mediation unit 34. Accordingly, the general request from the first abnormality diagnoses unit 33 and the general request from the IDM control unit 35 are inputted into the second mediation unit 34.

When the second mediation unit 34 receives plural general requests whose degrees of priority are judged by the judgment unit 32 not to be high, the second mediation unit 34 mediates these plural general requests and determines the control target value. The determined control target value Rm is transmitted to the output unit 37 via an output processing unit 38. A specific method of the mediation is not limited to a particular method and a known method may be employed. Note that the plural general requests to be subjected to the mediation processing by the second mediation unit 34 include the general requests from the IDM control unit 35 in addition to the general requests judged by the judgment unit 32.

The transfer unit 36 receives the emergency request and transmits the received emergency request to the output unit 37 as a control target value Rt. The output unit 37 temporarily stores the control target value transferred from the transfer unit 36 or determined by the second mediation unit 34 in a buffer (not illustrated), and outputs the control target value from the buffer to the VDC 5.

The vehicle control device 3 sets an operation speed of a route through which the emergency request flows faster than an operation speed of a route through which the general request flows, to transmit the emergency request to the VDC 5 at high speed. Specifically, an operation cycle of the input unit 31, the judgment unit 32, the transfer unit 36, and the output unit 37 which are surrounded by the dotted line Hg in FIG. 1 is set to be shorter than an operation cycle of the first abnormality diagnoses unit 33, the IDM control unit 35, and the second mediation unit 34 which are surrounded by the dotted line Lw of FIG. 1. For example, the operation cycle of the operation units (31, 32, 36, 37) surrounded by the dotted line Hg of FIG. 1 is set to 1 ms, while the operation cycle of the operation units (33, 35, 34) surrounded by the dotted line Lw of FIG. 1 is set to 10 ms.

The VDC 5 includes: an IBA&FCA input processing unit 52 configured to receive the control target value Rt from the transfer unit 36; an input processing unit 51 configured to receive the control target value Rm from the second mediation unit 34; a FCA operation permission processing unit 53 configured to determine whether to permit an operation of the collision avoidance emergency brake control (FCA); a second abnormality diagnoses unit 54; and a hydraulic pressure processing unit 55 configured to convert the control target value to a pressure value (bar) of brake oil.

The IBA&FCA input processing unit 52 performs input processing on the control target value Rt based on the collision avoidance emergency brake control (FCA) or the forward collision suppressing brake control (IBA). The input processing unit 51 performs input processing on the control target value Rm based on the constant vehicle speed control (ACC), the vehicle-to-vehicle distance correction control (DCA), the side-slip prevention control (AVDC), or the cornering speed control (CBA). The control target value (Rt, Rm) subjected to the input processing is diagnosed by the second abnormality diagnoses unit 54 to determine whether or not there is abnormality, and is then transmitted to the hydraulic pressure processing unit 55. Note that the second abnormality diagnoses unit 54 sends the control target value Rt based on the collision avoidance emergency brake control (FCA) from the transfer unit 36 to the hydraulic pressure processing unit 55 only when an instruction of permitting the FCA operation is given by the FCA operation permission processing unit 53. The hydraulic pressure processing unit 55 calculates a target pressure value (bar) of the brake oil, based on the control target value (Rt, Rm) of the braking amount. The target pressure value (bar) of the brake oil is transmitted to an actuator (not illustrated).

Figure 2:
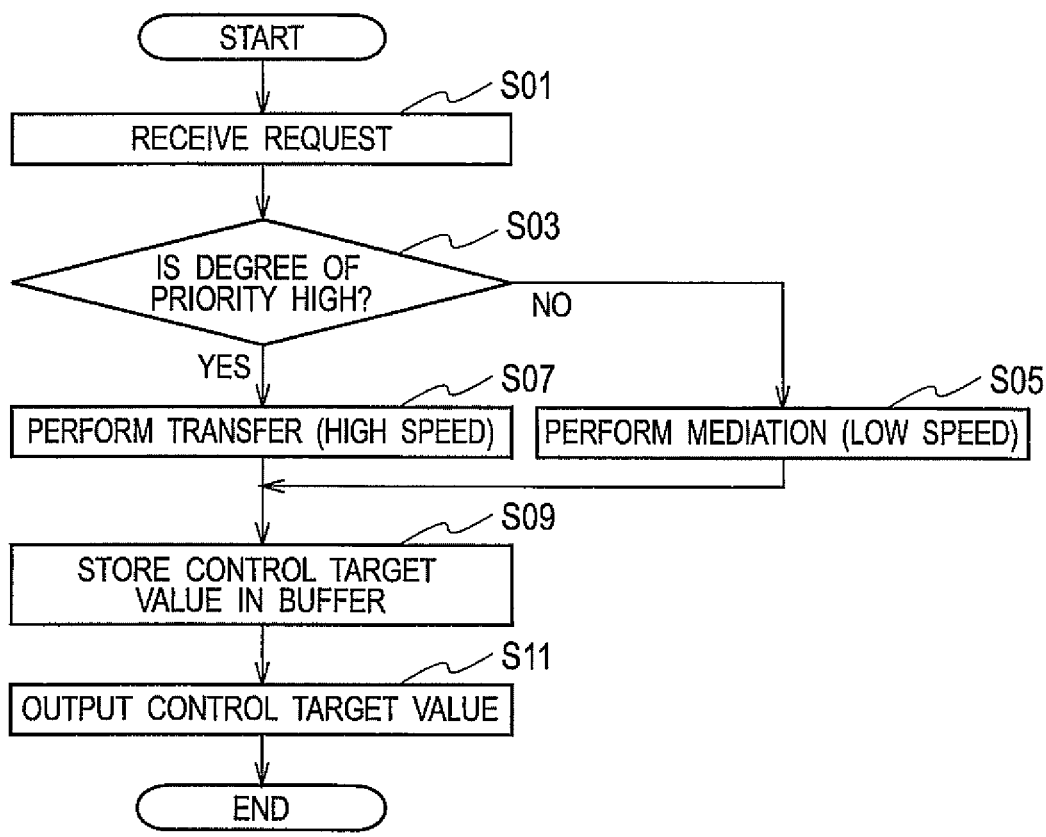
FIG. 2 is a flowchart which shows an example of an operation of the vehicle control device shown in FIG. 1 as a vehicle control method of the embodiment.

An example of an operation of the vehicle control device 3 illustrated in FIG. 1 is described with reference to FIG. 2 as a vehicle control method of the embodiment. First, in step S01, the input unit 31 receives plural requests for the braking amount of the vehicle from the advanced drive assisting system 1. In step S03, the judgment unit 32 judges whether or not the degree of priority of each of the requests inputted into the input unit 31 is high. When the degree of priority is high (YES in S03), the processing proceeds to the transfer processing of step S07. When the degree of priority is not high (NO in S03), the processing proceeds to the mediation processing of step S05. Note that the input processing of step S01 and the judgment processing of step S03 are executed at the operation cycle of 1 ms.

In step S05, the mediation processing is executed by the second mediation unit 34 at the operation cycle of 10 ms. Accordingly, plural general requests are inputted as targets of mediation by the second mediation unit 34 when the general requests are inputted into the input unit 31 at a cycle shorter than 10 ms. When there are plural general requests whose degrees of priority are judged not to be high, the second mediation unit 34 mediates the plural general requests to determine the control target value (Rm). Thereafter, the processing proceeds to step S09.

Meanwhile, in step S07, the transfer processing of the emergency request is executed by the transfer unit 36 at the operation cycle of 1 ms. When there is an emergency request whose degree of priority is judged to be high, the transfer unit 36 transfers the emergency request as the control target value (Rt) with the mediation processing being bypassed. Thereafter, the processing proceeds to step S09.

In step S09, the output unit 37 temporarily stores the control target value (Rm, Rt) in the buffer in the output unit 37. The processing proceeds to step S11, and the output unit 37 transmits the control target value (Rm, Rt) to the VDC at the operation cycle of 1 ms.

As described above, in the first embodiment, the following operations and effects can be obtained.

Although the vehicle control system has a function of mediating plural requests, an emergency request with a high degree of priority is not subjected to the mediation and is made to bypass the second mediation unit 34 to be transferred as the control target value Rt to the object to be controlled (VDC 5). This enables high-speed transfer of the emergency request with a high degree of priority. Furthermore, by providing the function of mediation, it is possible to reduce the number of input lines to the object to be controlled (VDC 5) and reduce the amount of resources required for information processing in the object to be controlled (VDC 5). Accordingly, the cost is reduced and the versatility is improved.

Since the operation cycle of the transfer unit 36 is shorter than the operation cycle of the second mediation unit 34, the cycle of the transfer processing is shorter than that of the mediation processing, and the transfer processing can be performed at high speed.

The physical amount to be controlled in the vehicle is the braking amount of the vehicle, and the general requests whose degrees of priority are not high are at least two of the request based on the constant speed traveling control executed in the constant vehicle speed control (ACC), the request based on the inter-vehicle distance control executed in the constant vehicle speed control (ACC) and the vehicle-to-vehicle distance correction control (DCA), the request based on the side-slip prevention control (AVDC), and the request based on the cornering speed control (CBA). Since these general requests are targets of the mediation processing, it is possible to reduce the number of input lines to the object to be controlled (VDC 5) and reduce the amount of resources required for the information processing in the object to be controlled (VDC 5).

The physical amount to be controlled in the vehicle is the braking amount of the vehicle, and the emergency request whose degree of priority is high is at least one of the request based on the collision avoidance emergency brake control (FCA) and the request based on the forward collision suppressing brake control (IBA). Since the emergency request whose degree of priority is high is a target of the transfer processing, a time lag due to the mediation processing is reduced.

In the conventional techniques, requests from plural control algorithms for different objectives are mediated and outputted. Accordingly, even when the operation load of the entire system is reduced, response delay occurs because the function of mediation is independently operating. As a result, when the response delay is unacceptable, the vehicle behavior becomes poor. In the embodiment, since the emergency request whose degree of priority is high is not a target of the mediation, vehicle behavior can be prevented from becoming poor due to the response delay.

Meanwhile, when all of the requests are one-sidedly transmitted by the transfer processing, change in the vehicle behavior becomes great. However, setting the general requests whose degrees of priority are low as targets of mediation can alleviate the change in the vehicle behavior.

Second Embodiment

In a second embodiment, description is given of a case where, when the control target value Rt is transferred from the transfer unit 36, the output unit 37 outputs either one of the control target value Rm determined by the second mediation unit 34 and the control target value Rt transferred from the transfer unit 36. The vehicle control device 3 in the second embodiment is different from that in the first embodiment in the configuration of the output unit 37. However, since other configurations are the same as those in the first embodiment, description and illustration thereof is omitted.

Figure 3:
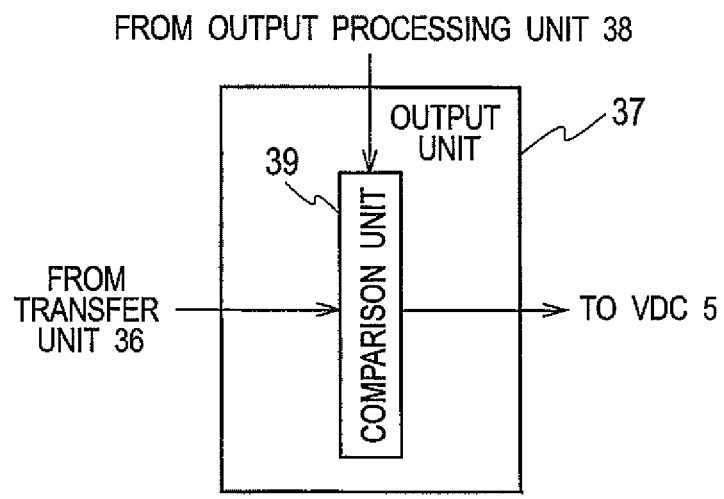
FIG. 3 is a block diagram showing a configuration of an output unit 37 in a second embodiment.

The configuration of the output unit 37 in the second embodiment is described with reference to FIG. 3. The output unit 37 includes a comparison unit 39 configured to compare the control target value Rm determined by the second mediation unit 34 and the control target value Rt transferred from the transfer unit 36, and outputs either one of the control target value Rm and the control target value Rt to the VDC 5, based on the comparison result by the comparison unit 39. For example, the comparison unit 39 compares the magnitudes of the control target value Rm and the control target value Rt and outputs the greater value to the VDC 5.

Next, operations in the second embodiment are described with reference to FIGS. 4 and 5. When no control target value Rt is transferred from the transfer unit 36, the output unit 37 outputs a control target value $Rm_0$ determined by the second mediation unit 34 to the VDC 5. This period is referred to as regular mediation period Nm.

Thereafter, in the first embodiment, when a control target value $Rt_1$ is transferred from the transfer unit 36, the control target value $Rt_1$ from the transfer unit 36 is transferred to the VDC 5 as it is. When the control target value $Rt_1$ is smaller than the control target value $Rm_0$, the control target value changes abruptly from the control target value $Rm_0$ to the control target value $Rt_1$. Accordingly, the vehicle behavior changes greatly.

In the second embodiment, when the control target value $Rt_1$ is transferred from the transfer unit 36, the comparison unit 39 compares the control target value $Rt_1$ with a control target value $Rm_1$ set at the time when the control target value $Rt_1$ is transferred, and outputs the greater control target value (control target value $Rm_1$) to the VDC 5.

Figure 4:
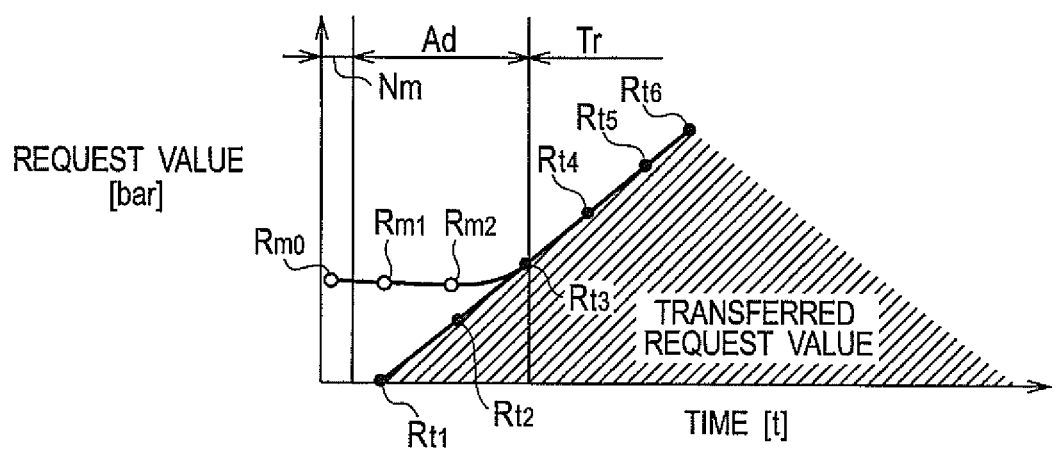
FIG. 4 is a graph for explaining effects of the second embodiment and shows an example of change of a control target value Rm and a control target value Rt over time.

The example illustrated in FIG. 4 shows a situation where the control target value Rt monotonically increases over time. When the control target value Rm determined by the second mediation unit 34 does not change or changes little over time, the magnitude relationship between the control target value Rt and the control target value Rm is reversed. The comparison unit 39 outputs the control target values $Rm_1$, $Rm_2$ in a period in which the control target value Rm is greater than the control target value Rt (this period is referred to as correction period Ad), and outputs the control target values $Rt_3$, $Rt_4$, $Rt_5$, $Rt_6$, . . . in a period in which the control target value Rm is smaller than the control target value Rt (this period is referred to as transfer period Tr).

Figure 5:
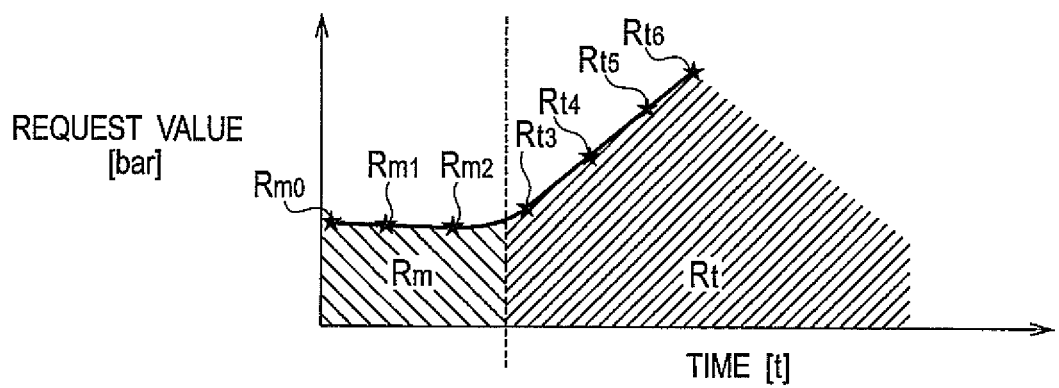
FIG. 5 is a graph for explaining the effects of the second embodiment and shows an example of change of the control target value outputted to a VDC 5 over time in the example shown in FIG. 4.

This causes the control target value outputted to the VDC 5 to change over time as shown in FIG. 5. The control target value Rm determined by the second mediation unit 34 is outputted in the regular mediation period Nm and the correction period Ad of FIG. 4, and the control target value Rt transferred from the transfer unit 36 is outputted in the transfer period Tr.

Figure 6:
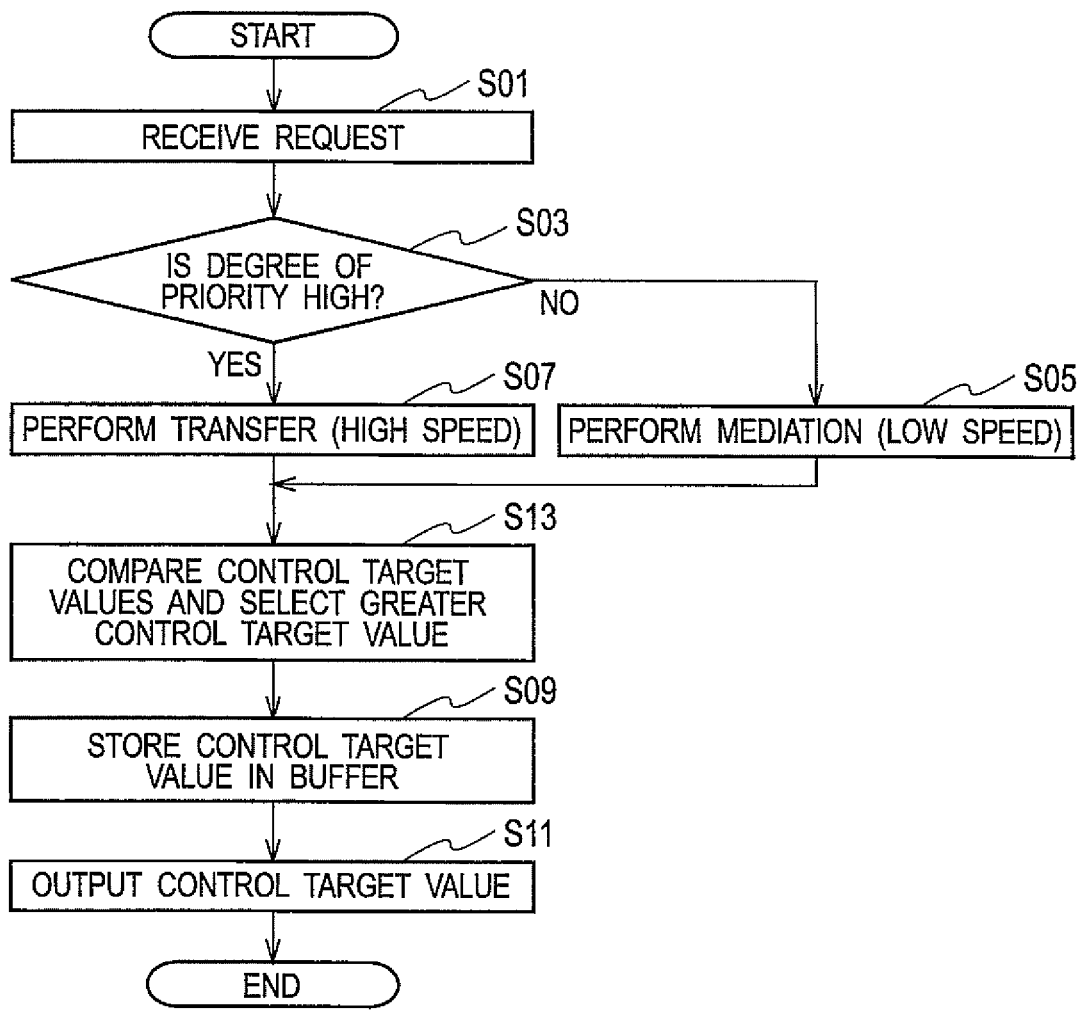
FIG. 6 is a flowchart showing an example of an operation of a vehicle control device 3 in the second embodiment.

An example of an operation of the vehicle control device 3 of the second embodiment is described with reference to FIG. 6. FIG. 6 is different from the flowchart of FIG. 2 in that step S13 is further provided before step S09. However, other points are the same as those of FIG. 2, and description thereof is omitted.

In step S13, when the control target value Rm is inputted from the second mediation unit 34 and the control target value Rt is transferred from the transfer unit 36 in a predetermined time period, the comparison unit 39 compares the control target value Rm and the control target value Rt with each other and selects the greater control target value. In step S11, the control target value selected by the comparison unit 39 is outputted to the VDC 5.

As described above, the comparison unit 39 compares the control target value Rm determined by the second mediation unit 34 and the control target value Rt transferred from the transfer unit 36, and either one of the control target value Rm and the control target value Rt is outputted to the VDC 5, based on the comparison result. This can alleviate the change in the vehicle behavior in a transition period of transition from the mediation control to the transfer control, as described with reference to FIGS. 4 and 5.

Third Embodiment

In a third embodiment, description is given of a case where, in the vehicle control device 3 of FIG. 1, the output unit 37 temporarily stores the control target value Rm determined by the second mediation unit 34 and the control target value Rt transferred from the transfer unit 36 respectively in different buffers. The vehicle control device 3 in the third embodiment is different from that in the first embodiment in the configuration of the output unit 37. However, the other configurations are the same as those in the first embodiment, and description and illustration thereof is omitted.

Figure 7:
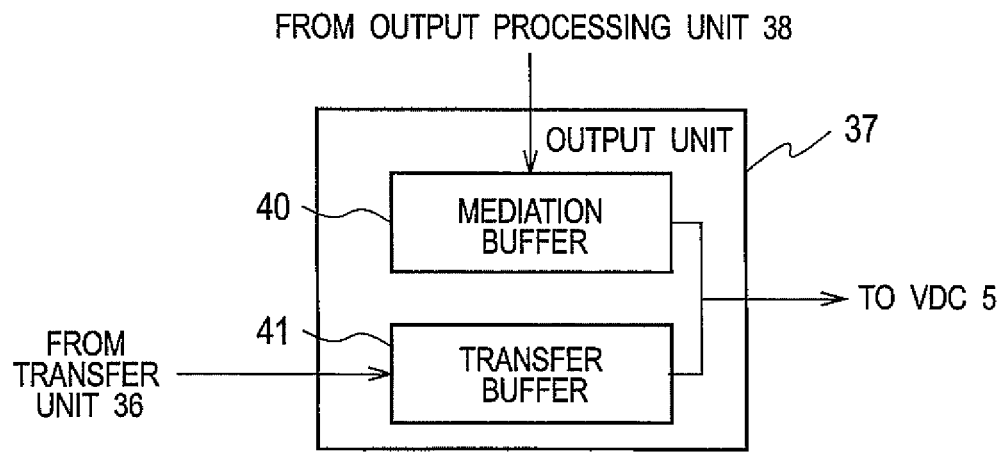
FIG. 7 is a block diagram showing a configuration of the output unit 37 in a third embodiment of the present invention.

The configuration of the output unit 37 in the third embodiment is described with reference to FIG. 7. The output unit 37 includes a mediation buffer 40 configured to store the control target value Rm determined by the second mediation unit 34 and a transfer buffer 41 configured to store the control target value Rt transferred from the transfer unit 36. The output unit 37 can output the control target value Rm and the control target value Rt to the VDC 5.

Figure 8:
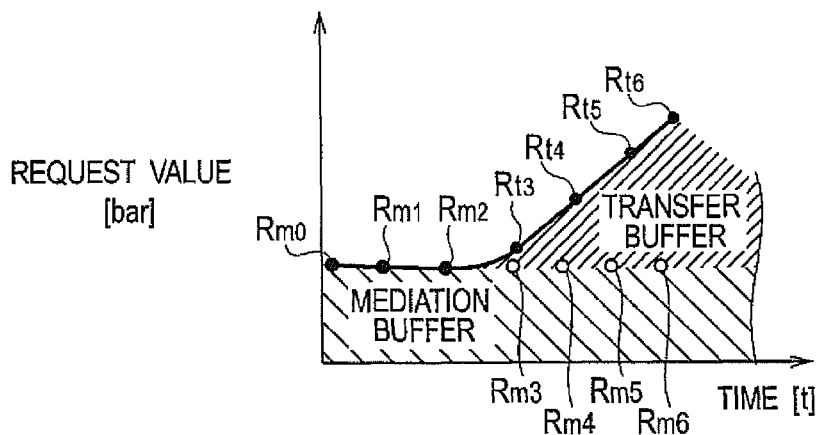
FIG. 8 is a graph for explaining effects of the third embodiment and shows an example of change of the control target value outputted to the VDC 5 over time in the example shown in FIG. 4.

An example of the change of the control target value outputted to the VDC 5 over time in the example shown in FIG. 4 is described with reference to FIG. 8. In the regular mediation period Nm and the correction period Ad of FIG. 4, the control target values $Rm_0$ to $Rm_2$ are outputted from the mediation buffer 40 to the VDC 5. Meanwhile, in the transfer period Tr, both of the control target values $Rm_3$ to $Rm_6$ and the control target values $Rt_3$ to $Rt_6$ are outputted respectively from the mediation buffer 40 and the transfer buffer 41 to the VDC 5. This enables braking control according to the control target values in the transfer period Tr. For example, so-called regeneration coordinated control can be performed in which a regenerative braking amount of a motor (vehicle driving means) is controlled based on the control target values $Rm_3$ to $Rm_6$ obtained by the mediation and a friction brake braking amount is controlled based on differences between the control target values $Rt_3$ to $Rt_6$ obtained by the transfer and the control target values $Rm_3$ to $Rm_6$ obtained by the mediation.

In the transfer period Tr, the output unit 37 may output, to the VDC 5, the control target values $Rm_3$ to $Rm_6$ obtained by the mediation and also the differences between the control target values $Rt_3$ to $Rt_6$ obtained by the transfer and the control target values $Rm_3$ to $Rm_6$ obtained by the mediation. This can reduce the resources for the difference operation in the VDC 5.

Figure 9:
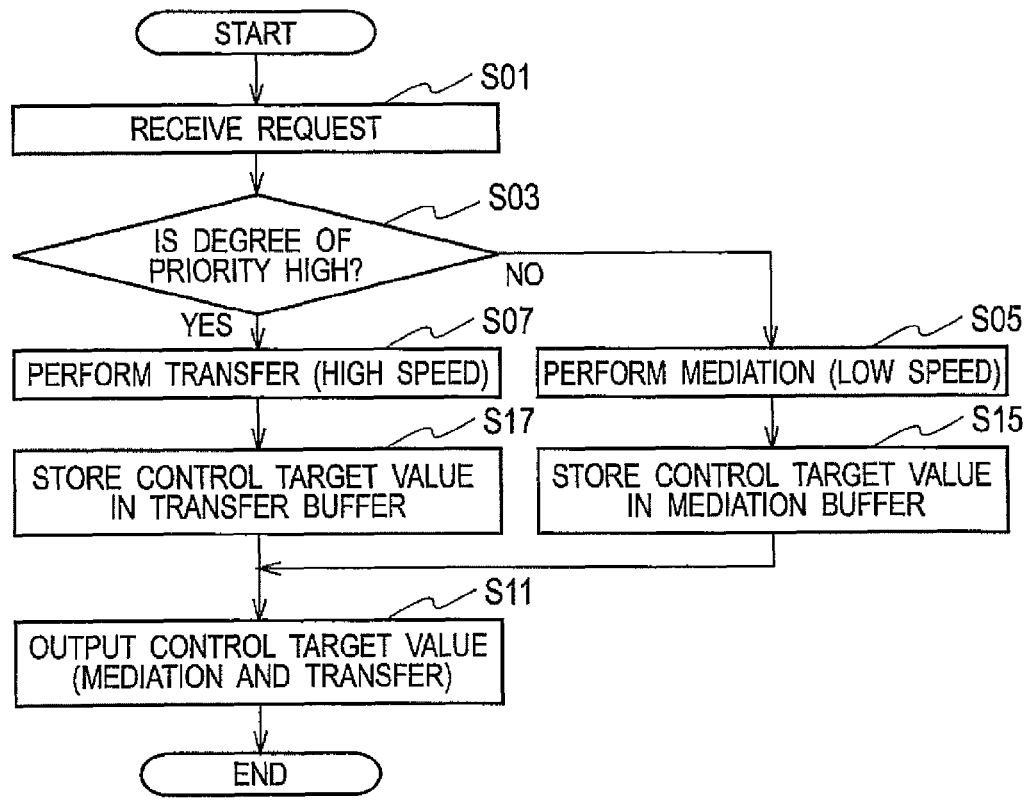
FIG. 9 is a flowchart showing an example of an operation of a vehicle control device 3 in the third embodiment.

An example of an operation of the vehicle control device 3 in the third embodiment is described with reference to FIG. 9. FIG. 9 is different from the flowchart of FIG. 2 in that steps S15 and S17 are provided instead of step S09. However, other points are the same as those of FIG. 2, and description thereof is omitted.

In step S15, the control target value Rm determined in step S05 is temporarily stored in the mediation buffer 40. Meanwhile, in step S17, the control target value Rt transferred in step S07 is temporarily stored in the transfer buffer 41. In step S11, the control target value Rm stored in the mediation buffer 40 and the control target value Rt stored in the transfer buffer 41 are both outputted to the VDC 5.

As described above, the output unit 37 includes the mediation buffer 40 and the transfer buffer 41, and this allows both of the control target value Rm obtained by the mediation and the control target value Rt obtained by the transfer to be outputted to the object to be controlled (VDC 5). Accordingly, the object to be controlled (VDC 5) can perform braking control according to the control target values. For example, as shown in FIG. 8, the regeneration coordinated control can be performed by using both of the control target value Rm and the control target value Rt.

In the conventional technique, a higher-layer ECU (for example, ADAS 1) requests a lower-layer ECU (for example, IDM 3 or VDC 5) to perform interruption processing, in order to prevent response delay when synchronization cannot be obtained as in an in-vehicle controller area network (CAN). Since the request transferred in the interruption processing is the same as those transferred in other cases, the object to be controlled (VDC 5) cannot grasp whether or not the transferred request is the request transferred by the interruption processing. In the embodiment, since the output unit 37 includes the mediation buffer 40 and the transfer buffer 41, the object to be controlled (VDC 5) can grasp which type of request the received request is.

In the conventional technique, the transmitting (IDM 3) side multiplexes and transmits data for judging the request in the object to be controlled (VDC 5), accordingly data with multiplicity cannot be transmitted when there is one buffer for outputting the requests. Providing the mediation buffer 40 and the transfer buffer 41 in the output unit 37 enables transmission of the data with multiplicity.

Although the contents of the present invention have been described above by using the embodiments, the present invention is not limited to the description of these embodiments. It is obvious to those skilled in the art that various changes and improvements can be made.

For example, in the third embodiment, it is preferable that the output unit 37 further includes the comparison unit 39. As a result of the comparison by the comparison unit 39, it is possible to send both of the control target value Rm obtained by the mediation and the control target value Rt obtained by the transfer only in the transfer period Tr, and to send only the control target value Rm obtained by the mediation in the regular mediation period Nm and the correction period Ad in which the regeneration coordinated control is unnecessary. Thus, the control target values can be efficiently sent.

The invention claimed is:

1. A vehicle control device for a vehicle having an advanced driver assistance system, the vehicle control device comprising:

an input unit configured to receive a plurality of requests for a physical amount to be controlled in a vehicle, the plurality of requests received at least in part from the advanced driver assistance system;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by the judgment unit to be high, transfer the thus-judged request as the control target value;

an output unit configured to output the control target value transferred from the transfer unit or determined by the mediation unit to an object to be controlled;

wherein an operation speed of a route through which the request whose degree of priority is high flow is faster than an operation speed of a route through which the requests whose degree of priority are not high flow.

2. A vehicle control device for a vehicle having an advanced driver assistance system, the vehicle control device comprising:

an input unit configured to receive a plurality of requests for a physical amount to be controlled in a vehicle, the plurality of requests received at least in part from the advanced driver assistance system;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by the judgment unit to be high, transfer the thus-judged request as the control target value;

an output unit configured to output the control target value transferred from the transfer unit or determined by the mediation unit to an object to be controlled; and wherein an operation cycle of the transfer unit is shorter than an operation cycle of the mediation unit.

3. A vehicle control device for a vehicle having at least two of constant speed traveling control, inter-vehicle distance control, side-slip prevention control, and cornering speed control, the vehicle control device comprising:

an input unit configured to receive a plurality of requests for a physical amount of braking to be controlled in a vehicle, the plurality of requests received from some or all of the constant speed traveling control, the inter-vehicle distance control, the side-slip prevention control, and the cornering speed control;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by the judgment unit to be high, transfer the thus-judged request as the control target value;

an output unit configured to output the control target value transferred from the transfer unit or determined by the mediation unit to an object to be controlled;

wherein the requests whose degrees of priority are not high are at least two of a request based on a constant speed traveling control, a request based on inter-vehicle distance control, a request based on side-slip prevention control, and a request based on cornering speed control.

4. A vehicle control device for a vehicle having an advanced driver assistance system, the vehicle control device comprising:

an input unit configured to receive a plurality of requests for a physical amount of braking to be controlled in a vehicle, the plurality of requests received at least in part from the advanced driver assistance system;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by judgment unit to be high, transfer the thus-judged request as the control target value;

an output unit configured to output the control target value transferred from the transfer unit or determined by the mediation unit to an object to be controlled;

wherein the request whose degree of priority is high is at least one of a request based on collision avoidance emergency brake control and a request based on forward collision suppressing brake control.

5. A vehicle control device for a vehicle having an advanced driver assistance system, the vehicle control device comprising:

an input unit configured to receive a plurality of requests for a physical amount to be controlled in a vehicle, the plurality of requests received at least in part from the advanced driver assistance system;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by the judgment unit to be high, transfer the thus-judged request as the control target value;

an output unit configured to output the control target value transferred from the transfer unit or determined by the mediation unit to an object to be controlled;

wherein the output unit includes a comparison unit configured to compare the control target value determined by the mediation unit and the control target value transferred from the transfer unit;

when no control target value is transferred from the transfer unit, the comparison unit outputs the control target value determined by the mediation unit; and when the control target value is transferred from the transfer unit, the comparison unit outputs the control target value determined by the mediation unit in a period in which the control target value determined by the mediation unit is greater than the control target value transferred from the transfer unit, and outputs the control target value transferred from the transfer unit in a period in which the control target value determined by the mediation unit is not greater than the control target value transferred from the transfer unit.

6. A vehicle control device for a vehicle having an advanced driver assistance system, the vehicle control device comprising:

an input unit configured to receive a plurality of requests for a physical amount to be controlled in a vehicle, the plurality of requests received at least in part from the advanced driver assistance system;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by the judgment unit to be high, transfer the thus-judged request as the control target value;

an output unit configured to output the control target value transferred from the transfer unit or determined by the mediation unit to an object to be controlled; and wherein the output unit includes a mediation buffer configured to store the control target value determined by the mediation unit and a transfer buffer configured to store the control target value transferred from the transfer unit.

7. A vehicle control device for a vehicle having at least two of constant speed traveling control, inter-vehicle distance control, side-slip prevention control, cornering speed control, collision avoidance emergency brake control and forward collision suppressing brake control, the vehicle control device comprising:

an input unit configured to receive a plurality of requests for breaking amounts by brakes of the vehicle, the plurality of requests received from the at least two of constant speed traveling control, inter-vehicle distance control, side-slip prevention control, cornering speed control, collision avoidance emergency brake control and forward collision suppressing brake control;

a judgment unit configured to judge whether or not a degree of priority of each of the received requests is high;

a mediation unit configured to, when there are a plurality of requests whose degrees of priority are judged by the judgment unit not to be high, mediate the thus-judged plurality of requests to determine a control target value;

a transfer unit configured to, when there is a request whose degree of priority is judged by the judgment unit to be high, transfer the thus-judged request as the control target value; and an output unit configured to output the control target value transferred from the transfer unit or determined by the mediation unit to an object to be controlled, wherein the requests whose degrees of priority are not high are at least two of a request based on the constant speed traveling control, a request based on the inter-vehicle distance control, a request based on the side-slip prevention control, and a request based on the cornering speed control, and the request whose degree of priority is high is at least one of a request based on the collision avoidance emergency brake control and a request based on the forward collision suppressing brake control.

\* \* \* \* \*